Figures 1, 2, 3:
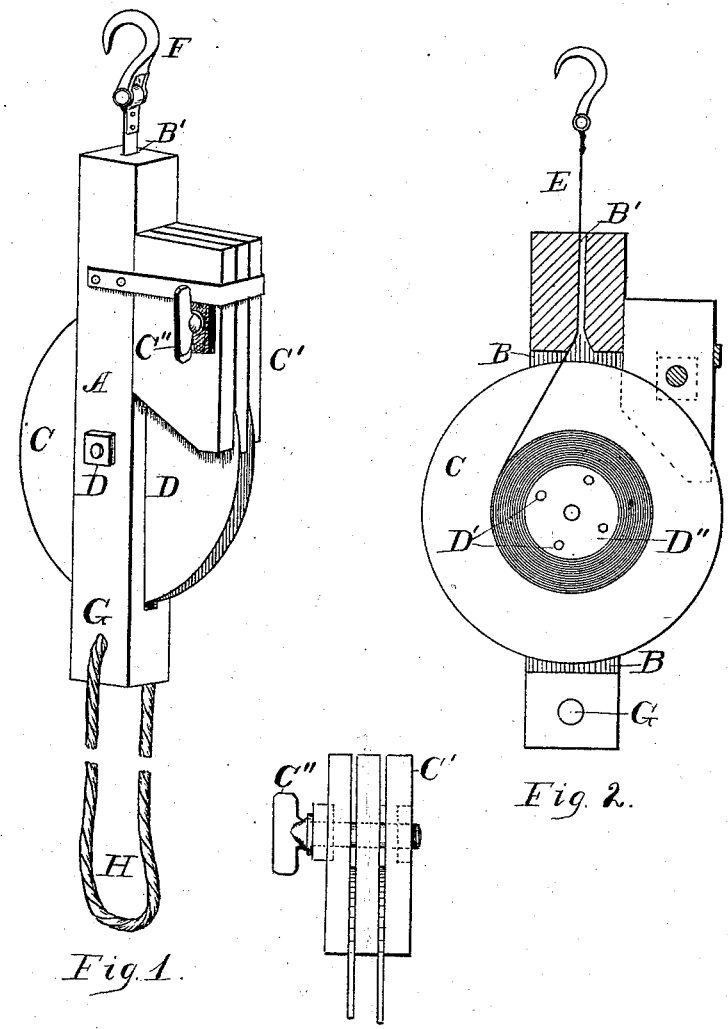

(No Model.)

F. A. BONE.
FIRE ESCAPE.

No. 294,109. Patented Feb. 26, 1884.

WITNESSES:
Emma Carey
Clara Sugenheim

INVENTOR:
Frank A Bone
By _____ Attorney.

UNITED STATES PATENT OFFICE.

FRANK A. BONE, OF LEBANON, OHIO.

FIRE-ESCAPE.

SPECIFICATION forming part of Letters Patent No. 294,109, dated February 26, 1884.

Application filed May 3, 1883. (No model.)

*To all whom it may concern:*

Be it known that I, FRANK A. BONE, of Lebanon, in the county of Warren and State of Ohio, have invented a new and useful Improvement in Fire-Escapes, which improvement is fully set forth in the following specification and accompanying drawings, in which—

Figure 1 is a perspective view of my improved fire-escape. Fig. 2 is a central vertical sectional view of the same. Fig. 3 is a front view of sheave and clamping-screw.

The object of the present invention is to provide a convenient portable fire-escape that can easily be attached to the opening or window of a building, while at the same time it is provided with a brake for regulating the speed in descending.

In the drawings, A is the main frame or sheave-block of the fire-escape, made of wood, iron, or of any suitable material. Through the central part of the sheave-block is a longitudinal slot, B, of suitable length. The sheave-block itself may be made of one or more pieces. The pieces forming the sides of the slot extending the whole length of the sheave may be constructed of two pieces, the inner pieces at each end of the slot of separate pieces, the whole fastened together by means of bolts, screws, rivets, or any other suitable manner. I prefer the latter method of construction, as it thus enables the frame to be taken apart for the purpose of repairs, or for facility of construction. A longitudinal vertical aperture, B', extends from the upper face of the frame to the upper end of the slot B.

Midway between the ends of the slot B is placed a bolt, D, extending through the side pieces, A. Two circular disks, of iron or any suitable material, are placed on this bolt and permitted to revolve freely. Centrally between the disks is placed spool D", and two or more rivets or bolts, D', pass through these disks and the spool near the center, to keep the disks a slight distance apart. At the upper part of the disks and alternating with them are three or more wings, C', secured to the main frame. These wings may be made of wood or any suitable material, one of them being placed between the two disks C and one on each outer side of the disks. Around the upper part of these wings a strap-iron hook is placed, with the ends securely fastened to the frame. Through the wings, near the outer edge, and just above the periphery of the disks C, is placed a thumb-screw, C", provided with suitable nuts for the purpose of clamping the wings over the disks. For this purpose the outer edge of the wings are more or less flexible. A spring of rubber or other material may be placed under the thumb-screw to equalize its action on the disks. Between the disks, and securely fastened to the spool D", is secured a steel ribbon, E, of sufficient length. This ribbon is coiled firmly around the spool D", so it can be drawn out, so that the spool and disks revolve to any length desired. The ribbon passes through the vertical slot B' and works freely in it. The end of the ribbon is provided with a hook or grappling-iron, F, for the purpose of attaching the same to the window-sill or object in the room, when desired.

At the lower end of the frame A is an opening, G, through which a rope, strap, or chain, H, is passed, forming a loop to be used as a stirrup. The lower end of the frame may be extended any desired length, and be provided with a cross-bar or stage attachment.

In operating this device in case of a fire the grappling-hook is attached to the window-sill or upper part of the window. The thumb-screw C" is then screwed tight and the person is ready to descend. Placing one or both feet or legs in the stirrup H, he grasps the upper part of the frame A with one hand, while with the other hand unscrews the thumb-screw until the weight of the person causes the disks with the tape to revolve, thereby allowing the device with the person to descend in safety to the ground.

What I claim as new is—

1. The combination of the sheave-block A, having the longitudinal slot B, opening B', with the pulley D", composed of the disks, as shown, and the wings C', provided with the thumb-screw C", substantially as herein set forth.

2. The combination of the sheave-block A, having the longitudinal slot B and vertical slot B', and the rope, strap, or chain H, with the pulley D", disks C, wings C', clamping-screw C", and the tape E, substantially as herein set forth.

In testimony that I claim the foregoing I have hereunto set my hand in the presence of witnesses.

FRANK A. BONE.

Witnesses:
ANNIE B. DILATUSH,
WALTER S. DILATUSH.